United States Patent
Mizutani

(10) Patent No.: US 7,519,856 B2
(45) Date of Patent: Apr. 14, 2009

(54) FAULT TOLERANT SYSTEM AND CONTROLLER, OPERATION METHOD, AND OPERATION PROGRAM USED IN THE FAULT TOLERANT SYSTEM

(75) Inventor: Fumitoshi Mizutani, Tokyo (JP)

(73) Assignee: NEC Corporation, Tokyo (JP)

( * ) Notice: Subject to any disclaimer, the term of this patent is extended or adjusted under 35 U.S.C. 154(b) by 520 days.

(21) Appl. No.: 11/311,338

(22) Filed: Dec. 20, 2005

(65) Prior Publication Data
US 2006/0150004 A1 Jul. 6, 2006

(30) Foreign Application Priority Data
Dec. 21, 2004 (JP) .............................. 2004-369380

(51) Int. Cl.
*G06F 11/00* (2006.01)
(52) U.S. Cl. .............................. 714/11; 714/12; 714/13
(58) Field of Classification Search .............. 714/11–13
See application file for complete search history.

(56) References Cited

U.S. PATENT DOCUMENTS

| | | | |
|---|---|---|---|
| 5,163,148 A * | 11/1992 | Walls | ........................ 707/204 |
| 5,384,906 A * | 1/1995 | Horst | ........................ 713/375 |
| 5,838,894 A * | 11/1998 | Horst | ........................ 714/11 |
| 5,887,146 A | 3/1999 | Baxter et al. | |
| 5,953,742 A | 9/1999 | Williams | |
| 6,026,461 A | 2/2000 | Baxter et al. | |
| 6,122,756 A | 9/2000 | Baxter et al. | |
| 6,157,967 A * | 12/2000 | Horst et al. | ........................ 710/19 |
| 7,178,058 B2 | 2/2007 | Tsukahara | |
| 2002/0152418 A1 | 10/2002 | Griffin et al. | |
| 2002/0152419 A1 | 10/2002 | McLoughlin et al. | |
| 2004/0010789 A1 * | 1/2004 | Yamazaki et al. | ............ 718/102 |
| 2004/0153756 A1 * | 8/2004 | Tsukahara | .................... 714/13 |
| 2004/0208130 A1 | 10/2004 | Mizutani et al. | |
| 2006/0149986 A1 * | 7/2006 | Mizutani | ..................... 713/375 |
| 2006/0178615 A1 * | 8/2006 | Ronborg et al. | ................ 604/46 |

FOREIGN PATENT DOCUMENTS

| | | |
|---|---|---|
| JP | 61-005350 | 1/1986 |
| JP | 07-023079 | 1/1995 |
| JP | 07-306796 | 11/1995 |
| JP | 08-221285 | 8/1996 |

(Continued)

*Primary Examiner*—Emerson C Puente
(74) *Attorney, Agent, or Firm*—Foley & Lardner LLP

(57) ABSTRACT

There is provided a fault tolerant system capable of adequately performing error processing, synchronization processing, and resynchronization processing for realizing a fault tolerant function in accordance with the system state. The fault tolerant system comprises at least two systems including: a CPU subsystem; an IO subsystem connected to the CPU subsystem; an FT controller to be connected between the CPU subsystem and IO subsystem; and crosslinks connecting own system and other system through the FT controller. The CPU subsystem operates at the same timing with a CPU subsystem of other system in lock-step. The FT controller manages a plurality of system operations, according to which both systems perform error processing, duplication processing, and resynchronization processing for fault tolerant, by associating a plurality of states corresponding to the system operations with predetermined event signals. According to these event signals, the FT controller selects the system operations while changing the states for every system and allows the CPU subsystem to perform the selected system operation.

16 Claims, 11 Drawing Sheets

FOREIGN PATENT DOCUMENTS

| | | |
|---|---|---|
| JP | 08-241286 | 9/1996 |
| JP | 10-187472 | 7/1998 |
| JP | 11-510934 | 9/1999 |
| JP | 2000-298594 A | 10/2000 |
| JP | 2004-110803 A | 4/2004 |
| JP | 2004-326151 A | 11/2004 |

* cited by examiner (ACCESS CONTROL BETWEEN CPU SUBSYSTEM AND IO SUBSYSTEM)

(COMPARISON OF ACCESS FROM OWN CPU SUBSYSTEM TO OWN IO SUBSYSTEM AND ACCESS FROM OTHER CPU SUBSYSTEM TO OWN IO SYSTEM)

(CPU BUS ACCESS COMPARISON)

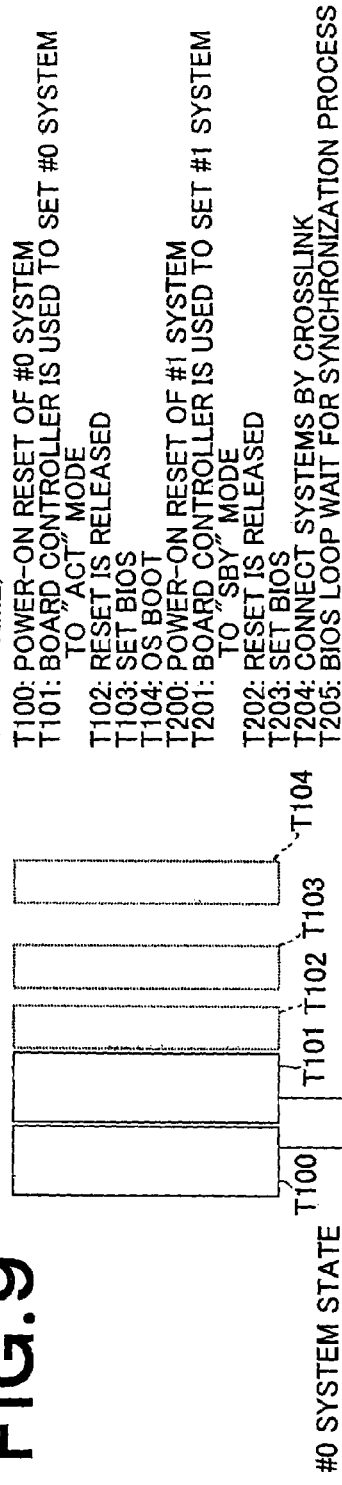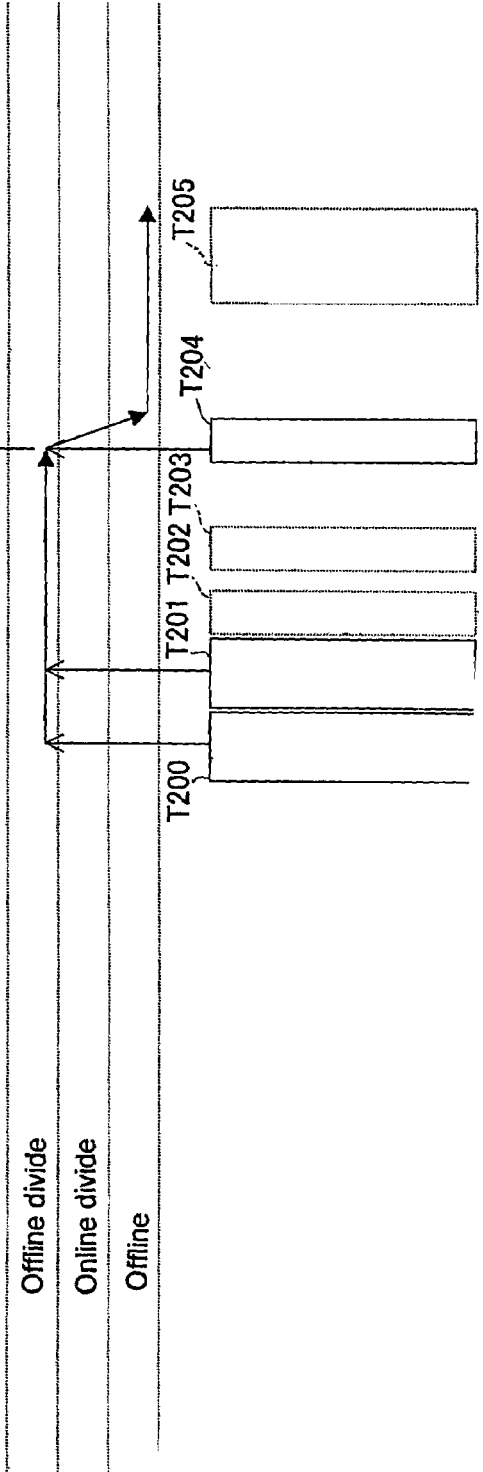
FIG.9

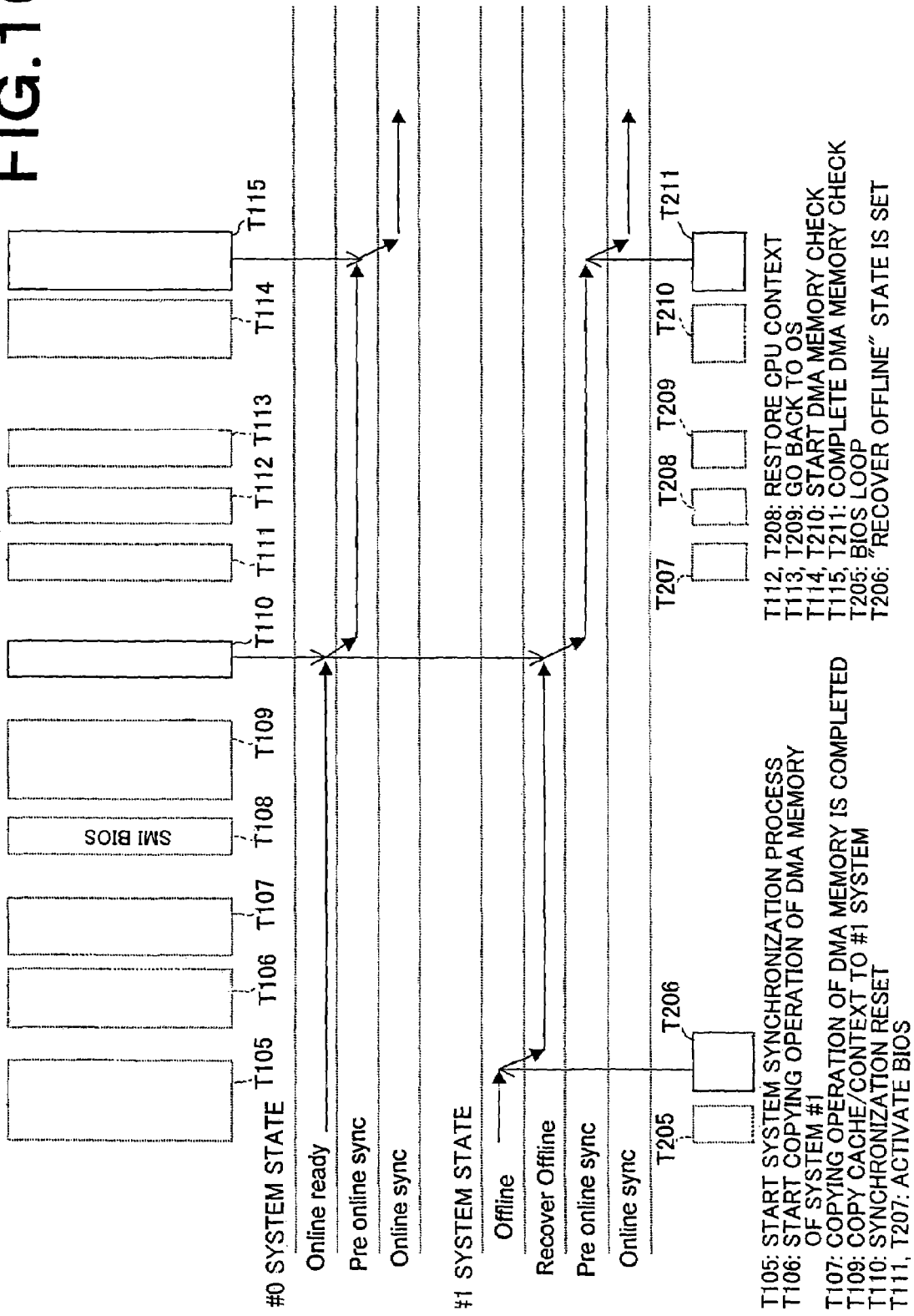

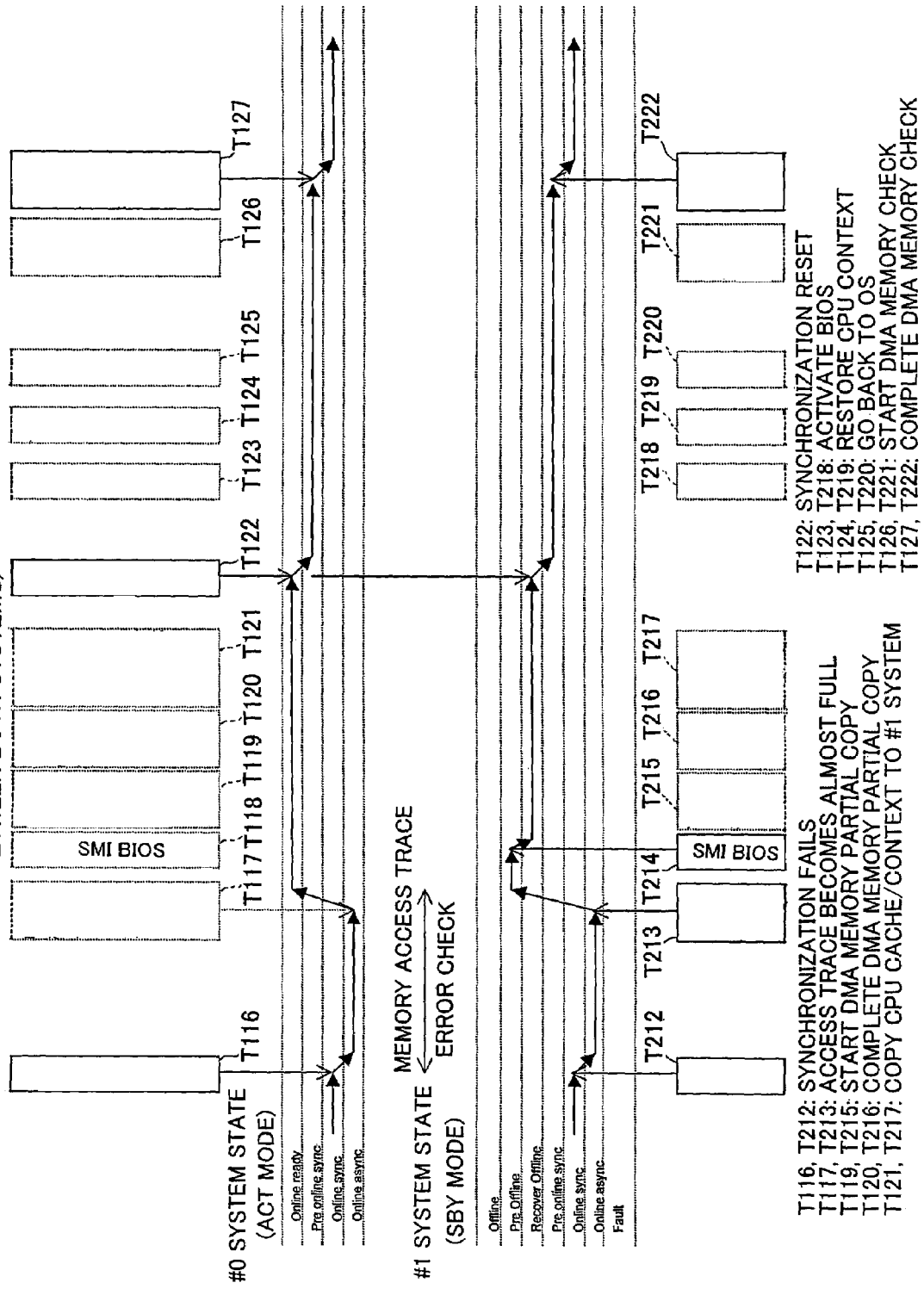

FAULT TOLERANT SYSTEM AND CONTROLLER, OPERATION METHOD, AND OPERATION PROGRAM USED IN THE FAULT TOLERANT SYSTEM

BACKGROUND OF THE INVENTION

1. Field of the Invention

The present invention relates to a fault tolerant system and a controller, operation method, and operation program used in the fault tolerant system and, more particularly, to a management of a state that specifies a system operation for realizing a fault tolerant function in a computer system and a control using the state.

2. Description of the Related Art

Conventionally known is a fault tolerance computer system (hereinafter, referred to as "fault tolerance system") in which all components, such as a CPU (Central Processing Unit), memory, PCI (Peripheral Component Interconnect), disk, power source, and the like, that constitute a computer hardware are multiplexed (for example, duplicated or triplicated). In such a computer system, even if a failure occurs in any of components, the system can continue operating without interruption.

In the fault tolerant system, a multiplexed plurality of CPUs (processors) executes the same operation at the same timing while constantly establishing synchronization between them (which is referred to as "lock-step synchronization"). Even if a failure occurs in one of the plurality of CPUs that execute the same operation in lock-step synchronization, other CPUs continue normal operation. That is, if any failure occurs, the fault tolerant system can continue operating without adversely affecting the operation of software such as an operating system or application software executed by the CPU.

As related arts concerning such a fault tolerant system, U.S. patent application publication No. 2002/0152418 A1 discloses an apparatus and method for executing instructions in lock-step synchronization, U.S. patent application publication No. 2002/0152419 A1 discloses an apparatus and method for accessing a mass storage device in a fault-tolerant server, and U.S. Pat. No. 5,953,742 discloses a technique of making a memory copy between a plurality of processing sets each including a processor that operates in lock-step synchronization to establish high-speed resynchronization.

However, in the abovementioned fault tolerant systems of the related arts, it has been difficult to adequately perform error processing, duplication (synchronization) processing, and resynchronization processing for realizing a fault tolerant function in accordance with the system state such as CPU operation state (agreement or disagreement between operations of CPU buses), or access permission state (agreement or disagreement between IO accesses).

SUMMARY OF THE INVENTION

The present invention has been made in view of the above conventional situation, and an object thereof is to adequately perform error processing, synchronization processing, and resynchronization processing for realizing a fault tolerant function in accordance with the system state.

To achieve the above object, according to the present invention, there is provided a fault tolerant system including a plurality of systems constituted by the same computer hardware components, each of the systems comprising: a processor section that can operate in a lock-step synchronous state between own system and other system; an input/output section to be connected to the processor section; a controller to be connected between the processor section and input/output section; and a signal transmission path that connects the own system and other system through the controller, the controller comprising: state management means for managing a plurality of system operations for performing error processing, synchronization processing, and resynchronization processing for fault tolerant by associating a plurality of states corresponding to the system operations with predetermined event signals; and control means for selecting the plurality of system operations while changing the plurality of states for every system based on the event signals and allowing the processor section to perform selected system operation.

In the present invention, the plurality of system operations may include: an access control for controlling access between the processor section and input/output section in the own system; an access control for controlling access between the processor section and input/output section across the own and other systems; an access comparison for comparing access from the processor section to the input/output section across the own and other systems; an access comparison for of comparing access on a bus within the processor section across the own and other systems; and a main storage copy for copying data from a main storage of the processor section across the own and other systems. Preferably, the main storage copy may include a partial copy for partially copying data from the main storage of the processor section across the own and other systems.

In the present invention, the plurality of states include: an online-system state corresponding to a state integrated into a system providing a service; an offline-system state corresponding to a state separated from a system providing a service; and a fault-system state corresponding to a state separated from a system providing a service due to error detection.

Preferably, the online-system state may include: an online divide state corresponding to a state where the processor sections of the own and other systems operate in asynchronous state at power-on time; an online ready state corresponding to a state where the processor sections of the own and other systems operate in asynchronous state; a pre-online synchronous state corresponding to a state where the processor sections of the own and other systems operate in synchronous state and data in a main storage of the processor section is being checked; an online synchronous state corresponding to a state where the processor sections of the own and other systems operate in synchronous state; and an online asynchronous state corresponding to a temporary state where a disagreement occurs in operation on a bus in the processor section between the own and other systems in the online synchronous state, the offline-system state group includes: an offline divide state corresponding to a state where the processor sections of the own and other systems operate in asynchronous state at power-on time and constituting a pair with the online divide state; an offline state corresponding to a state where the processor sections of the own and other systems operate in asynchronous state and constituting a pair with the online ready state; a recover offline state corresponding to a state where copying data from the main storage of the processor section across the own and other systems is performed and the processor sections of the own and other systems operate in asynchronous state; and a pre-offline state corresponding to a state being separated from the system at the time when a disagreement occurs in operation on a bus in the processor section between the own and other systems.

According to the present invention, there is provided a controller used in a fault tolerant system including a plurality of systems constituted by the same processor section and input/output section, the controller comprising: state management means for managing a plurality of system operations for performing error processing, synchronization processing, and resynchronization processing for fault tolerant by associating a plurality of states corresponding to the system operations with predetermined event signals; and control means for selecting the plurality of system operations while changing the plurality of states for every system based on the event signals and allowing the processor section to perform selected system operation.

According to the present invention, there is provided an operation method used in a fault tolerant system including a plurality of systems constituted by the same processor section and input/output section, the operation method comprising the steps of: managing a plurality of system operations for performing error processing, synchronization processing, and resynchronization processing for fault tolerant by associating a plurality of states corresponding to the system operations with predetermined event signals; and selecting the plurality of system operations while changing the plurality of states for every system based on the event signals and allowing the processor section to perform selected system operation.

According to the present invention, there is provided an operation program used in a fault tolerant system including a plurality of systems constituted by the same processor section and input/output section, the operation program enabling a computer to execute an operation method comprising the steps of: managing a plurality of system operations for performing error processing, synchronization processing, and resynchronization processing for fault tolerant by associating a plurality of states corresponding to the system operations with predetermined event signals; and selecting the plurality of system operations while changing the plurality of states for every system based on the event signals and allowing the processor section to perform selected system operation.

According to the present invention, it is possible to adequately perform error processing, synchronization processing, and resynchronization processing for realizing a fault tolerant function in accordance with the system state.

BRIEF DESCRIPTION OF THE DRAWINGS

In the accompanying drawings:

FIG. 9 is a timing chart for explaining the processing sequence at power-on time in the embodiment;

FIG. 10 is a timing chart for explaining the processing sequence at the time when synchronization processing of CPU subsystem is performed in the embodiment; and FIG. 11 is a timing chart for explaining the processing sequence at the time from occurrence of synchronization failure caused due to a disagreement in CPU bus operation between both systems to the time when resynchronization operation is performed in the embodiment.

DETAILED DESCRIPTION OF THE PREFERRED EMBODIMENTS

A preferred embodiment of a fault tolerant system and a controller, operation method, and operation program used in the fault tolerant system according to the present invention will be described below in detail with reference to the accompanying drawings.

Figure 1:
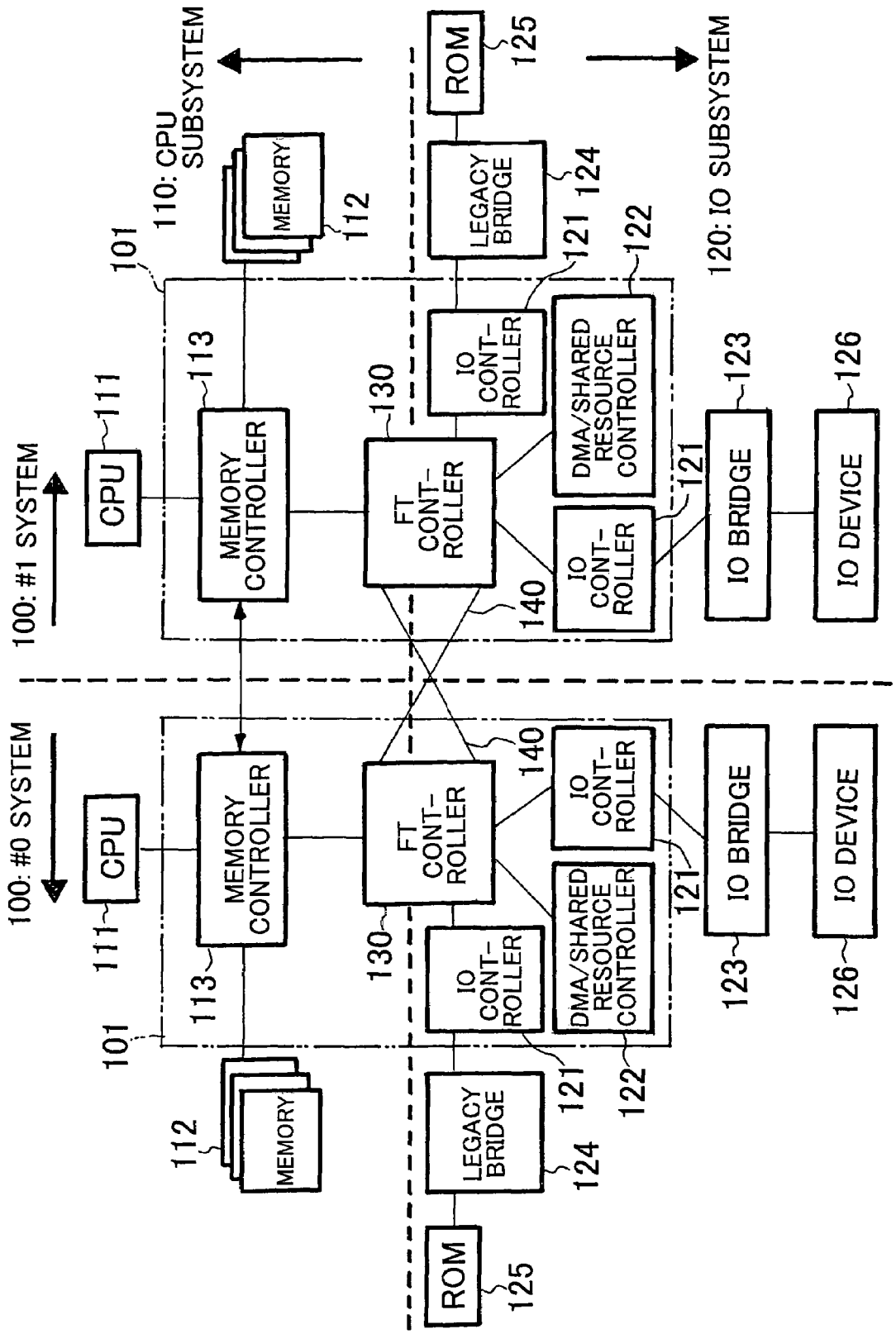
FIG. 1 is a block diagram schematically showing the entire configuration of a fault tolerant system according to an embodiment of the present invention.

FIG. 1 shows a basic configuration of the fault tolerant system according to the embodiment of the present invention.

The fault tolerant system (also referred to as "fault tolerant computers" or "fault tolerant servers") shown in FIG. 1 is a multiplexed computer system including a plurality of systems constituted by the same computer hardware configuration. Here, the fault tolerant system adopts a duplicated computer system and includes two systems 100 and 100, that is, "#0 system" and "#1 system". In the example of FIG. 1, #0 system and #1 system independent from each other constitute a single fault tolerant system. In the following description, when one (for example, #0 system) of the two systems 100 and 100 is referred to as "own system", the other (for example, #0 system) is as "other system".

As shown in FIG. 1, each of the systems 100 and 100 includes a CPU subsystem 110 serving as a processor section, IO (Input Output) subsystem 120 serving as an input/output section, an FT (Fault Tolerant) controller 130 to be connected to the CPU subsystem 110 and IO subsystem 120 and serving as a controller constituting the main part of a state management means and control means of the present invention, crosslinks 140 and 140 serving as a signal transmission path that connects the CPU subsystem 110 of own system and IO subsystem 120 of other system. In the embodiment of the present invention, the FT controller 130 is mounted as a board controller 101 in the fault tolerant system together with various controllers (memory controller 113, IO controller 121, and DMA/shared resource controller 122 to be described later) in the CPU subsystem 110 and IO subsystem 120.

The CPU subsystem 110 and IO subsystem 120 of own system are accessible from each other through the FT controller 130. Further, the CPU subsystem 110 of own system and IO subsystem 120 of other system are accessible from each other through the FT controller 130 of own system, crosslink 140, and FT controller 130 of other system.

The CPU subsystem 110 includes a CPU 111, a memory 112 serving as a main memory of the CPU 111, and a memory controller 113 connected between the CPU 111 and memory 112 through a CPU bus. The CPU subsystems 110 and 110 of own system and other system are connected to each other through the memory controllers 113 and 113.

The CPU subsystems 110 and 110 of own system and other system perform the same operation at the same timing in lock-step synchronization. When one CPU subsystem 110 that is providing a service is separated from the other due to detection of hardware failure, the other CPU subsystem 110 that performs the same operation continue providing the service without interruption.

The IO subsystem 120 has a redundant configuration between the systems 100 and 100. This redundancy is provided by mirroring processing made through software that is executed by the CPU 111 of the CPU subsystem 110. In the example of FIG. 1, the IO subsystem 120 has a plurality (two, in FIG. 1) of IO controllers 121 and 121 for connecting the CPU 111 and an IO device 126, and a DMA/shared resource controller (not shown) for duplicating the CPU subsystems 110 and 110 between own system and other system. The DMA/shared resource controller includes: a DMA (Direct Memory Access) controller (not shown) for copying the contents of the main memory areas of the memories 112 and 112; a shared memory for sharing information between the systems 100 and 100; and a shared resource controller having an intersystem communications function.

An IO device 126 such as a not shown hard disk drive (HDD) is connected to one of the two IO controllers 121 and 121 through an IO bridge 123. A ROM 125 is connected to the other IO controller 121 through a legacy IO bridge 124. The IO controllers 121 and 121 are accessible from the CPU subsystem 110 of own system and the CPU subsystem 110 of other system. As the IO bridge 123, an interface bridge such as PCI (Peripheral Component Interconnect) bus, USB (Universal Serial bus), or IEEE (Institute of Electrical and Electronic Engineers) 1394 can be exemplified. As the legacy IO bridge 124, an interface bridge such as PS (Personal System)/2 port or RS-232C (Recommended Standard 232 version C) port can be exemplified.

The FT controller 130 has a fault tolerant function, that is, (1) function of connecting and disconnecting the CPU subsystem 110 and IO subsystem 120 in own system and across own and other systems; (2) error detection function; and (3) function of realizing duplicating the CPU subsystems 110 and 110 between own system and other system. The functions of the FT controller 130 will be described below with reference to FIGS. 2 to 6.

Figure 2:
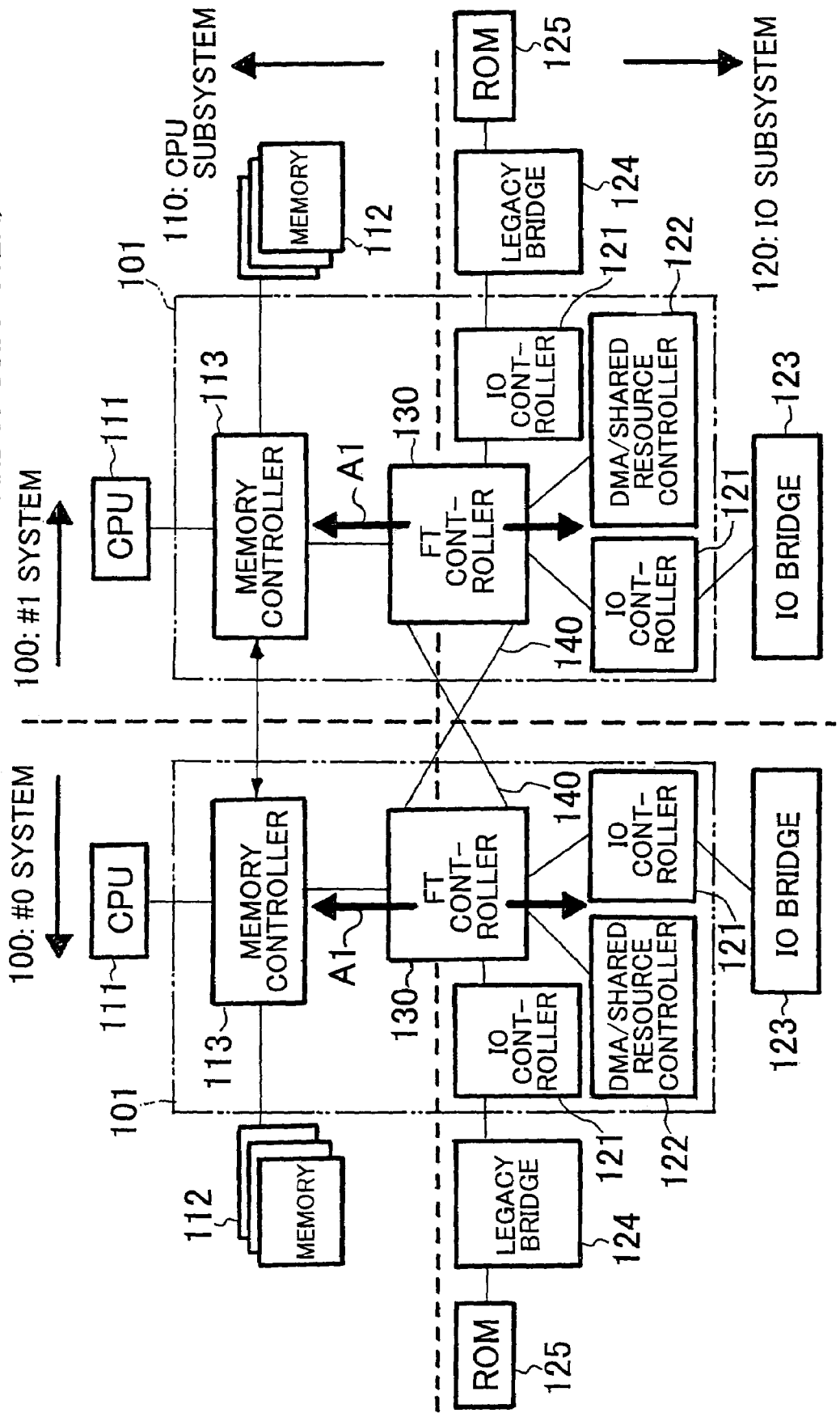
FIG. 2 is a view for explaining a state where a fault tolerant controller performs access control between a CPU subsystem of own system and IO subsystem of own system in the embodiment.
Figure 3:
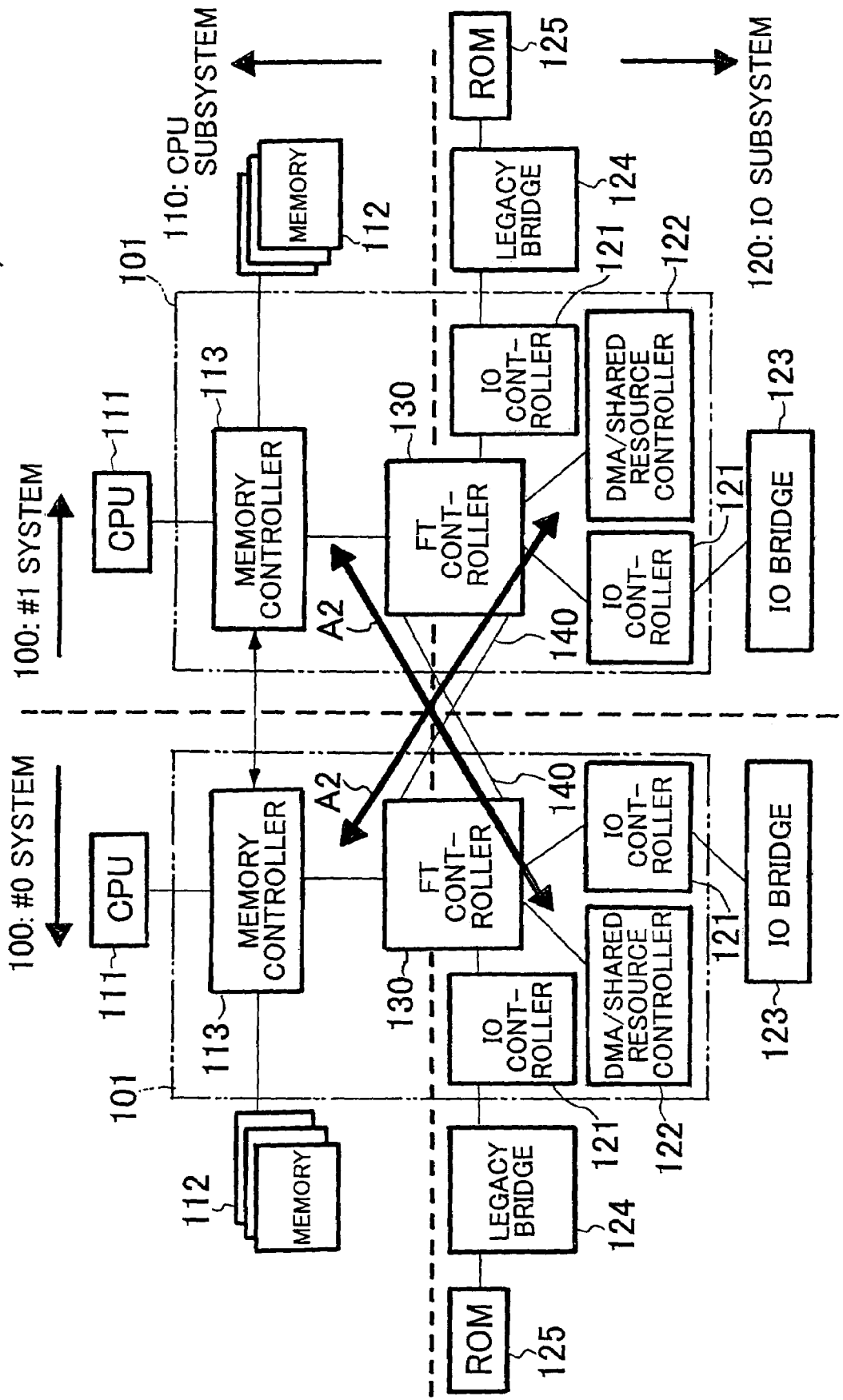
FIG. 3 is a view for explaining a state where the fault tolerant controller performs access control between both systems through crosslinks in the embodiment.

The FT controller 130 permits or restricts accesses between the CPU subsystem 110 and IO subsystem 120 in own system and across own and other systems to connect and disconnect the CPU subsystem 110 and IO subsystem 120 within own system and across own and other systems. FIG. 2 shows the flow (denoted by arrows A1 and A1 in the drawing) of operation signals exchanged at the time of access operation (including outbound access from CPU subsystem 110 to IO subsystem 120 and inbound access from IO subsystem 120 to CPU subsystem 110) between the CPU subsystem 110 and IO subsystem 120 within own system, and FIG. 3 shows the flow (denoted by arrows A2 and A2 in the drawing) of operation signals exchanged at the time of access operation (including outbound access and inbound access) between the CPU subsystem 110 of own system and IO subsystem 120 of other system through the crosslinks 140 and 140.

Figure 4:
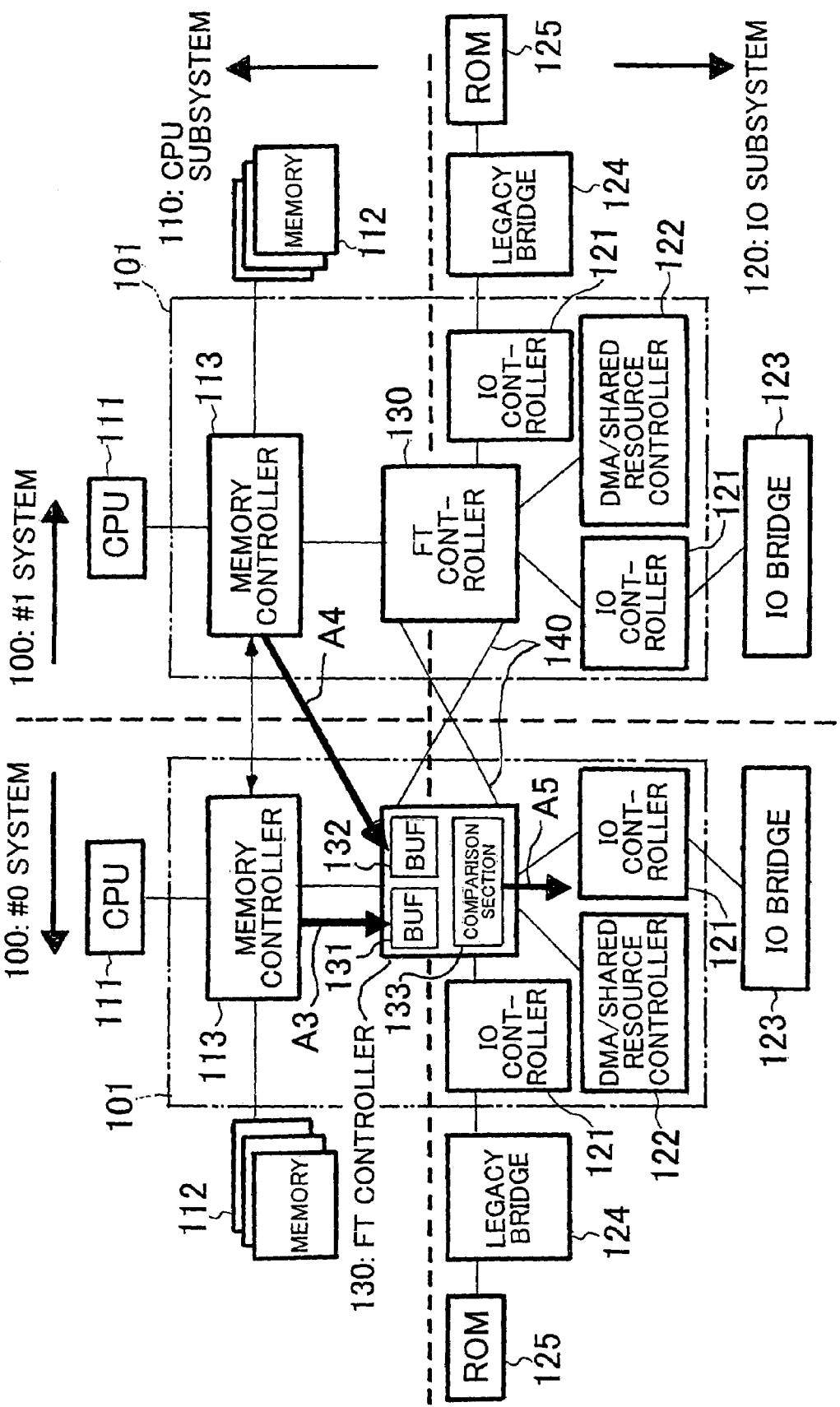
FIG. 4 is a view for explaining a state where the fault tolerant controller compares an access from own CPU subsystem to own IO subsystem and access from other CPU subsystem to own IO system in the embodiment.

Further, the FT controller 130 has, as an error detection function for realizing a fault tolerant function, a comparison function (comparison circuit) of comparing operation signals generated at the time of access operation from the CPU subsystem 110 of own system to IO subsystem 120 of own system and an operation signal generated at the time of access operation from the CPU subsystem 110 of other system to IO subsystem 120 of own system, as shown in FIG. 4.

The comparison circuit in the FT controller 130 functionally includes a buffer (BUF) 131 connected to the memory controller 113 of own system, a buffer (BUF) 132 connected to the memory controller 113 of other system through the crosslink 140, and a comparison section 133 connected to the outputs of the both buffers 131 and 132.

In the comparison circuit, the comparison section 133 compares an operation signal generated at the time of access operation from the CPU subsystem 110 of own system and an operation signal generated at the time of access operation from the CPU subsystem 110 of other system. In the case where a disagreement in the operation signals generated by both access operations occurs, the FT controller 130 including the comparison section 133 disconnects one of the CPU subsystems 110 and 110 and continues the operation of the other CPU subsystem 110. In the present embodiment, the comparison circuit is constituted using the buffers 131 and 132, so that even if a disconnection between the both signals occurs, it is possible to continue the operations of the CPU subsystems 110 and 110 for a predetermined period of time as far as the capacities of the buffers 131 and 132 permit without disconnecting one of the CPU subsystems 110.

FIG. 4 shows a state where the comparison section 133 in the FT controller 130 of system #0 compares an operation signal (denoted by arrow A3 in the drawing) to be input to the buffer 131, which is generated by access operation from the CPU subsystem 110 of system #0 to the IO subsystem 120 of system #0 and an operation signal (denoted by arrow A4 in the drawing) to be input to the buffer 132, which is generated by access operation from the CPU subsystem 110 of system #1 to the IO subsystem 120 of system #0 and outputs (denoted by arrow A5 in the drawing) a result (agreement or disagreement) of the comparison.

The CPU subsystem 110 uses a DMA controller of the DMA/shared resource controller 122 to copy all of or a part of the contents of the main storage area of the memory 112 in the CPU subsystem 110 that is providing a service to the main storage area of the memory 112 in the CPU subsystem 110 that is being in a standby state and to perform CPU reset, thereby realizing duplication of the CPU subsystems 110 of own system and CPU subsystem 110 of other system.

If the contents are not copied across the entire main storage area of the memory 112, the duplication operation between the CPU subsystems 110 and 110 cannot be guaranteed. However, once the duplication is started, the operation signals on CPU buses within the CPU subsystems 110 and 110, which are generated by access operations, are compared with each other, and the access operation made to the main storage contents in the memory 112 after occurrence of disagreement between the both signals is traced, thereby obtaining different information of the main storage contents between the memory 112 of own system and memory 112 of other system. A use of the difference information can reduce the amount of the main storage contents of the memory 112 to be copied, significantly reduce copy time, and perform, at high-speed, resynchronization operation, which is required in the case where a disagreement between operation signals of the both CPU buses occurs after the duplication has been established between the both CPU subsystems 110 and 110.

Figure 5:
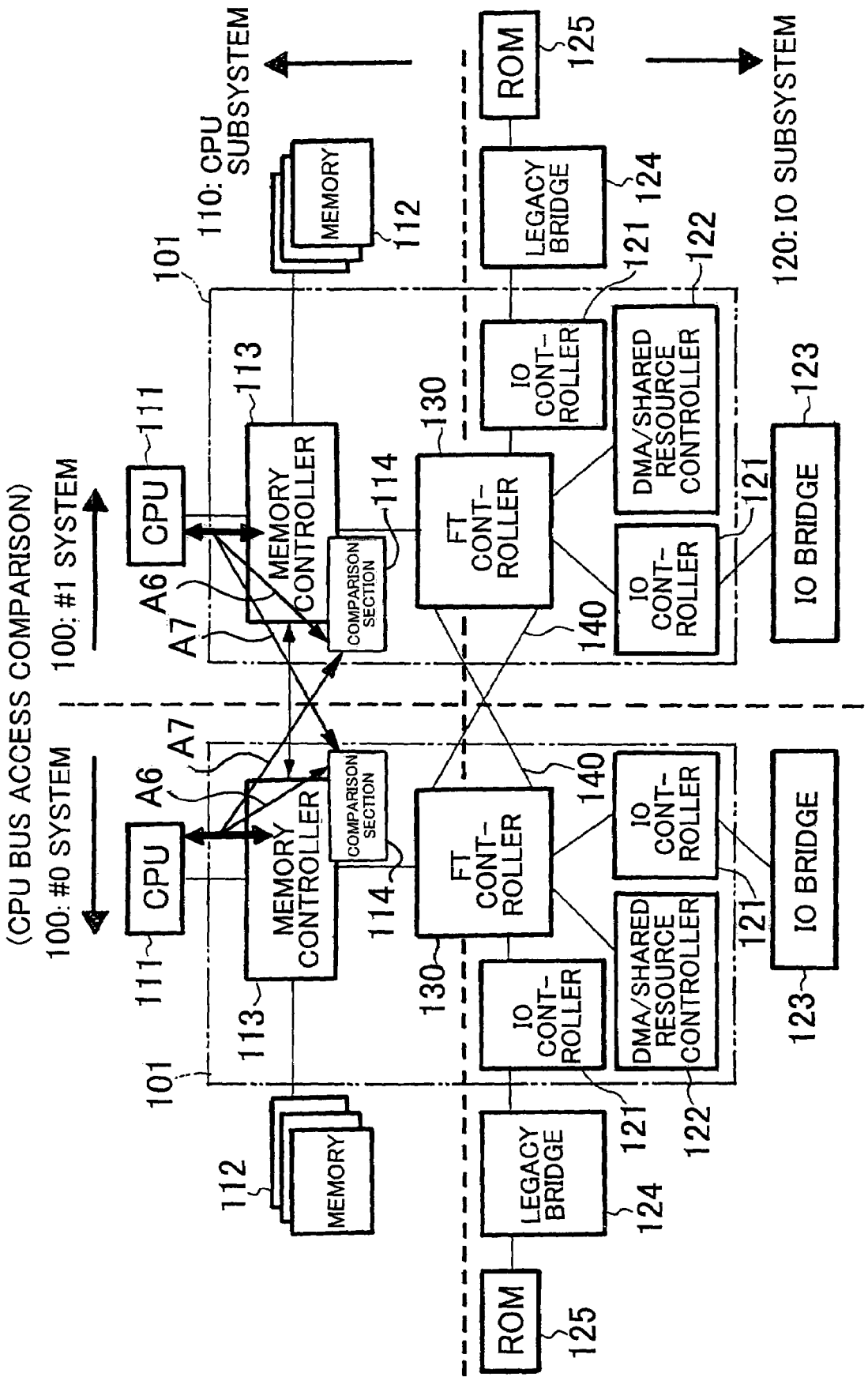
FIG. 5 is a view for explaining a state where a memory controller compares accesses to CPU buses in the embodiment.

To perform the above operations, the memory controller 113 in the CPU subsystem 110 has, as shown in FIG. 5, a function (CPU bus comparison function) of comparing operation signals between the CPU bus of the CPU subsystem 110 of own system 100 and the CPU bus of the CPU subsystem 110 of other system 100. As a section for realizing this function, a comparison section 114 is provided in the example of FIG. 5. The comparison section 114 compares the operation signal (denoted by arrow A6 in the drawing) of the CPU bus in the CPU subsystem 110 of own system and the operation signal (denoted by arrow A7 in the drawing) of the CPU bus in the CPU subsystem of other system and outputs a result (agreement or disagreement) of the comparison to the FT controller 130.

Further, as described above, the FT controller 130 has a function (hereinafter, referred to as "main storage access trace function") of tracing the access operation made to the main storage contents in the memory 112 after occurrence of disagreement between the both signals as a result of access operation made through the CPU buses in the both CPU subsystems 110 and 110 and obtaining difference information of the main storage contents between the memory 112 of own system and memory 112 of other system.

Figure 6:
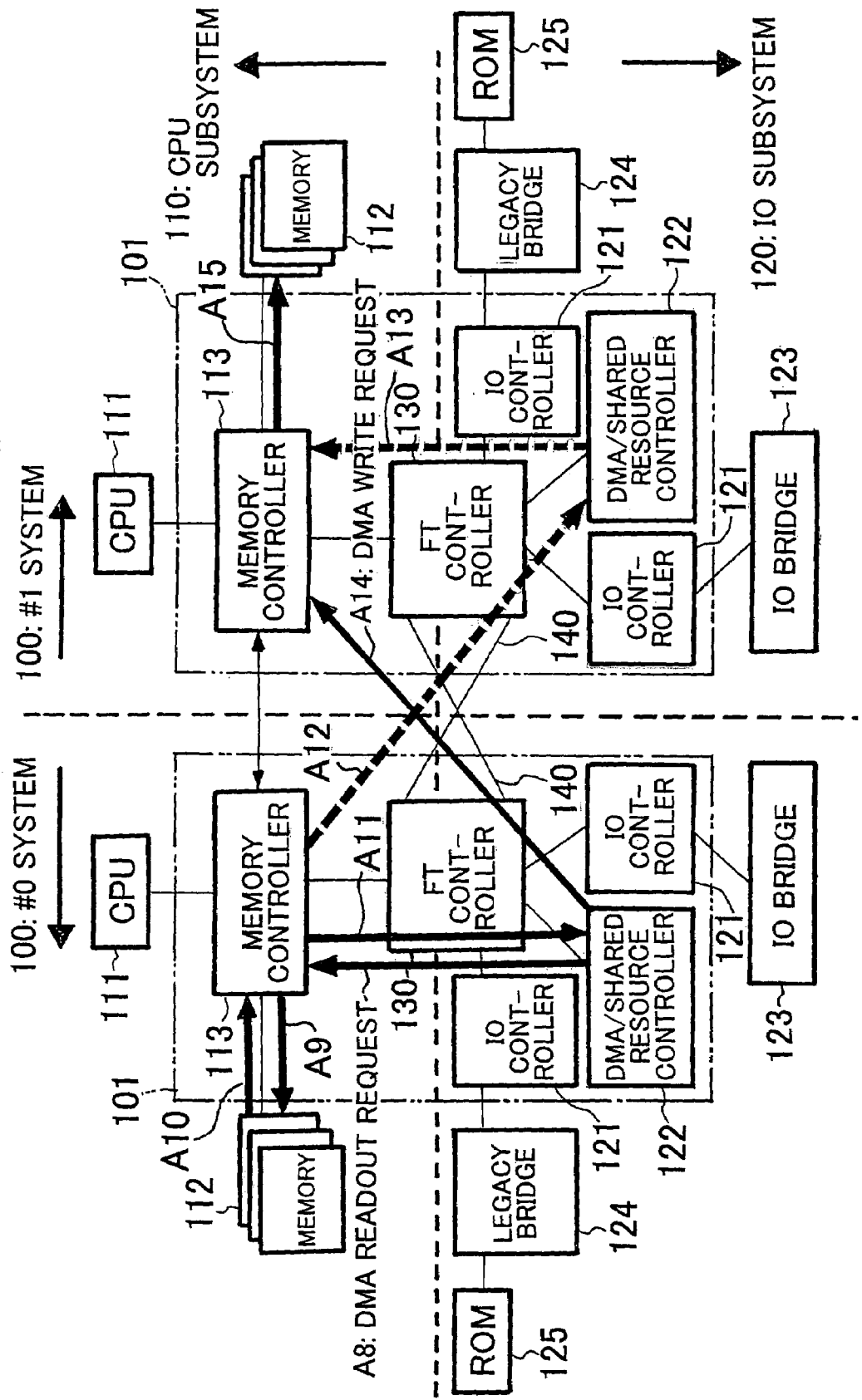
FIG. 6 is a view for explaining a state where a DMA/shared resource controller performs main storage copying operation in the embodiment.

FIG. 6 shows an example in which the DMA/shared resource controller 122 copies all of or a part of the main storage contents from #0 system to #1 system.

Firstly, in own system, a DMA readout request is issued from the DMA/shared resource controller 122 to the memory 112 through the FT controller 130 and memory controller 113 (denoted by arrows A8 and A9), and all of or a part of the main storage contents of the memory 112 is transmitted to a shared memory in the DMA/shared resource controller 122 through the memory controller 113 and FT controller 130 (denoted by arrows A10 and A11).

At the same time, a DMA write request is issued from the memory controller 113 of own system to the memory controller 113 of other system through the FT controller 130 of own system, crosslink 140, and FT controller 130 and DMA/shared resource controller 122 of other system (denoted by arrows A12 and A13), and all of or a part of the main storage contents of the memory 112 temporarily stored in the shared memory in the DMA/shared resource controller 122 of own system is copied to the memory 112 of other system through the FT controller 130 of own system, crosslink 140, FT controller 130 and memory controller 112 of other system (denoted by arrows A14 and A15).

In order to realize the above functions, the FT controller 130 of the present embodiment defines states representing the system operation states and specifies the operation of software that executes error processing, duplication processing, resynchronization processing according to the defined states, thereby performing the state management for realizing a fault tolerant function.

The separation (state transition) of the subsystems 110 and 120 at the time of error detection is promptly done by hardware; whereas the integration of the subsystems 110 and 120 is started by software. The software called up by the CPU 111 when a notification of the error detection is issued recognizes the system operation information (synchronous/asynchronous state of the CPU subsystem 110, access availability, or the like) according to the content of the detected error and the state information of the moment and selects processing to be performed.

The state managed by the FT controller 130 will be described.

The state managed by the FT controller 130 collectively represents a state of the CPU 111, an access permission state between the CPU subsystem 110 and IO subsystem 120, and a state of the link between the both systems 100 and 100. Transition from one state to another can be made by software control or hardware error detection event.

Further, as preliminary information of the state, "ACT (active)" mode and "SBY (stand-by)" mode which are exclusive operation modes for each system are defined. The FT controller 130 compares accesses from the CPU subsystem 110 of own system to IO subsystem 120 of own system or compares operations of the CPU bus in the CPU subsystem 110 in order to detect an error. In the case where the FT controller 130 cannot identify a specific error location, as in the case where a disagreement occurs in the comparison, it continues providing a service using the CPU subsystem 110 in "ACT" mode and separates the CPU subsystem 111 in "STB" mode from the system.

Tables 1 and 2 show the contents of respective states and operations to be defined.

TABLE 1

| State | Operation mode | Content |
|---|---|---|
| Online sync | ACT | CPUs of both systems operate in sync; Accessible to IOs of both systems; and Integration into system providing service is preferentially maintained at error detection time if there are no other factors that specify failure. |
|  | SBY | CPUs of both systems operate in sync; Accessible to IOs of both systems; and Preferentially separated from system providing service at error detection time if there are no other factors that specify failure. |
| Pre online sync | ACT | CPUs of both systems operate in sync; Accessible to IOs of both systems; This state is obtained after execution of DMA between both systems for duplication of CPUs; Software starts comparing main storage contents of both systems and "Online sync" is obtained after checking comparison result; and If error is detected at comparison check, integration into system providing service is preferentially maintained if there are no other factors that specify failure. |
|  | SBY | CPUs of both systems operate in sync; Accessible to IOs of both systems; This state is obtained after execution of DMA between both systems for duplication of CPUs; Software starts comparing main storage contents of both systems and "Online sync" is obtained after checking comparison result; and |

TABLE 1-continued

| State | Operation mode | Content |
|---|---|---|
| Online async | ACT | If error is detected at comparison check, preferentially separated from system providing service if there are no other factors that specify failure. State where CPU bus comparison function detects disagreement in "Online sync" state; Accessible to IOs of both systems; Temporal state for high-speed resynchronization; Main storage access is traced; and This state shifts to "Online ready" state when comparison buffer or memory for tracing main storage becomes "full" or "almost full" unless hardware or software specifies whether either of CPU subsystems has failed during this state. |
| | SBY | State where CPU bus comparison function detects disagreement in "Online sync" state; Accessible to IOs of both systems; Temporal state for high-speed resynchronization; Main storage access is traced; and This state shifts to "Pre offline" state when comparison buffer or memory for tracing main storage becomes "full" or "almost full" unless hardware or software specifies whether either of CPU subsystems has failed during this state. |
| Online ready | — | CPUs of both systems operate in async; This state indicates CPU subsystem that is providing service before duplication; Accessible to IOs of both systems; System in this state serves as copy source at duplication time; and This state shifts to "Pre online sync" state when synchronization reset is applied in combination with CPU in "Recover offline state" and, by this, it is possible to recognize that reset state is sync state, which is a different state from one at power-on time. |

TABLE 2

| State | Operation mode | Content |
|---|---|---|
| Online divide | — | CPUs of both systems operate in async; Crosslink is disconnected in "Offline ready" state; Accessible to IO of own system; however not accessible to IO of other system; and Accessible to DMA/shared resource controller that is required for duplicating CPUs. |
| Offline divide | — | CPUs of both systems operate in async; This state indicates CPU subsystem that is not providing service before duplication; Accessible to IO of own system; however not accessible to IO of other system; and Accessible to DMA/shared resource controller that is required for duplicating CPUs. |
| Offline | — | CPUs of both systems operate in async; This state indicates CPU subsystem that is not providing service before duplication; and Accessible to IOs of both systems. |
| Recover offline | — | CPUs of both systems operate in async; This state indicates CPU subsystem that is not providing service before duplication; Accessible to IOs of both systems; System in this state serves as copy source at duplication time; and This state indicates state where duplication processing is being executed and shifts to "Pre online sync" state and, by this, it is possible to recognize that reset state is sync state, which is a different state from one at power-on time. |
| Pre offline | — | CPUs of both systems operate in async; State immediately after CPU subsystem, which has entered "SBY" mode after occurrence of disagreement between signals in CPU buses, is determined to be disconnected from service for execution of high-speed |

TABLE 2-continued

| State | Operation mode | Content |
|---|---|---|
| | | resynchronization; This state shifts to "Recover offline" state when all CPUs enter SMM and all SMI ACKs (SMI entry signal of all CPUs) are returned to complete preparation for starting resynchronization processing; and Access to other subsystems is suppressed as in case of "Fault state". |
| Fault | — | State where disconnection from service has been made due to explicit failure detected by error detection operation; and Access to other subsystems including that in own system and those in other systems is suppressed. |

With reference to above Tables 1 and 2, details of the state will be described.

The state defined in the present embodiment is roughly divided into three: (1) state integrated into system that provides service (Online); (2) state separated from system that is providing service (offline); (3) state isolated from system that is providing service (Fault). Hereinafter, the above three states will be described respectively.

1. State being Integrated to System that Provides Service (Online)

The states representing this system operation state have a state name including "Online". The CPU subsystem 110 (CPU 111) of this state is actually providing a service. A plurality of states ST1 to ST5 of 1-1 to 1-5 are derived from this "Online" state depending on the synchronous state or access restriction.

1-1. "Online Divide" State ST1

This is a state set in the CPU subsystem 110 that is powered on first. Only one CPU subsystem 110 becomes state S1 in the fault tolerant system. The other CPU subsystem 110 that forms a pair with the one CPU subsystem 110 that becomes state S1 enters "Offline divide" state to be described later. Although CPU subsystem 110 in "Online divide" state ST1 can only access IO subsystem 120 of own system, but can gain full access to it, and BIOS (Basic Input Output System) that operates on CPU subsystem 110 proceeds to boot an OS.

1-2. "Online Ready"-State ST2

This is a progression of "Online divide" state ST1, where connection of the crosslink 140 is established. Of a pair of CPU subsystems 110 and 110 in "Online async" state (to be described later), one CPU subsystem 110 in "ACT" mode is shifted to "Online ready" state ST2 in the case where the buffer for temporarily storing information which has been obtained by the main storage access trace function at the detection time of disagreement in signals between IO accesses or between CPU buses exceeds a predetermined threshold and becomes "Almost Full" (at this time, the other CPU subsystem 110 in "SBY" state is shifted to "Pre offline" state (to be described later)). When one CPU subsystem 110 is shifted from "Online divide" state ST1 to "Online ready" state ST2, the other CPU subsystem is shifted from "Offline divide" state to "Offline" state (to be described later). Full bidirectional access is possible between CPU subsystem 110 in state ST2 and IO subsystem of other system.

1-3. "Pre Online Sync" State ST3

This is a state after a synchronization reset in synchronization processing has been released, where both system 100 and 100 are actually synchronized with each other. In "Pre online sync" state ST3 and "Online sync state" (to be described later), comparison of operation signals generated by outbound access operation from CPU subsystem 110 to IO subsystem 120 is effective.

"Pre online sync" state ST3 is a state where comparison check of the main storage contents between both systems to be performed in the synchronization processing has not been completed and perfect agreement in the main storage contents between both systems is not guaranteed. Thus, the "Pre online sync" state ST3 is not handled as a complete synchronous state and will not be subjected to high-speed synchronization processing. In the case of occurrence of failure or disagreement, CPU subsystem 110 in "SYB" mode is set to Fault; whereas the system cannot set CPU subsystem 110 in "ACT" mode to Fault irrespective of whether a failure occurs in own system or other system. During state ST3, the operation mode ("ACT" mode/"SBY" mode) of CPU subsystem 110 cannot be switched.

1-4. "Online Sync" State ST4

This is a complete synchronous state (duplicated state). In this case, both systems 100 and 100 are in "Online sync" state ST4. In this state ST4, which is a synchronous state, if a failure occurs, a function of separating the faulty system becomes effective. Further, if FSB (Front Sid Bus) comparison is performed, high-speed resynchronization is enabled.

1-5. "Online Async" State ST5

This is a temporary state to which the system is shifted in the case where a disagreement in operation signals between CPU buses is detected in "Online sync" state ST4. The systems in this state behave as if they were still in synchronization. Thus, if a failure occurs and the failure part is clear, a function of separating the failure part becomes effective. In this case, both systems 100 and 100 are in "Online sync" state ST5.

When the disagreement occurs in operation signal between CPU buses, operation according to the main storage access trace function is started. When the IO access buffer becomes "Full" or the size of the main storage access trace reaches the upper limit as a result of execution of the main storage access trace function, CPU subsystem 110 in "ACT" mode is shifted to "Offline ready" state (to be described later) and CPU subsystem 110 in "SBY" mode is shifted to "Pre offline" state (to be described later). When the error detection detects a failure in CPU subsystem 110 in "SBY" mode, the failed CPU subsystem 110 is shifted to "Fault" state (to be described later).

2. State Disconnected from System (Offline)

The states representing this system operation state have a state name including "offline". CPU subsystem 110 (CPU 111) in this state is disconnected from a service that is actually performed. A plurality of states ST6 to ST9 of 2-1 to 2-4 are derived from this "offline" state depending on the synchronous state or access restriction.

2-1. "Offline Divide" State ST6

This is a state immediately after a power-on reset has been performed at power-on time. That is, CPU subsystem 110 of system 100 that has not entered "Online divide" state ST1 enters this state. CPU subsystem 110 in this state cannot access IO subsystem 120 of other system but full bidirectional access is possible between CPU subsystem 110 and IO subsystem 120 of own system.

2-2. "Offline" State ST7

This is a progression of "Offline divide" state ST6, where connection of the crosslink 140 is established. Further, this is a state after reset has been applied to CPU subsystem 110 in "Fault" state (to be described later). When one CPU subsystem 110 is shifted from "Offline divide" state ST6 to "Offline" state ST7, the other CPU subsystem 110 in "Online divide" state ST1 is shifted to "Online ready" state ST2. Although CPU subsystem in "Online ready" state ST2 can access both IO subsystems 120 of own system and other system unlike "Offline divide" state ST6, this access operation is made in asynchronous state, so that an access conflict with CPU 111 of other system is managed by software.

2-3. "Recover Offline" State ST8

This is a progression of "Offline" state ST7, where a recover mode is set in order to enter duplication processing in which the main storage of the memory 112 is copied by the DMA controller of the DMA/shared resource controller 122. Further, when all CPUs 111 enters SMM (System Management Mode) according to SMI (System Management Interrupt) entry signal which is an interrupt request and SMI ACK (ACKnowledgement) is returned from all CPUs to complete preparation for resynchronization processing in "Pre offline" state ST9 (to be described later), the state shifts to this state ST8. In this state ST8, only an asynchronous access request can be made from CPU subsystem 110 to IO subsystem 120. In the state ST8, a completion to the asynchronous access request from IO subsystem 120 to CPU subsystem 110 and an access request from IO subsystem 120 can be made.

2-4. "Pre Offline" State ST9

When an explicit error has not been detected in CPU subsystem 110 in "Online async" state ST5 and buffer for temporarily storing information which has been obtained by the main storage access trace function at the detection time of disagreement in signals between IO accesses or between CPU buses becomes "Almost Full", CPU subsystem 110 in "SBY" mode in "Online async" state ST5 is shifted to this "Pre offline" state ST9 by software instruction (at this time, the other CPU subsystem 110 in "ACT" mode is shifted to "Online ready" state ST2). At this time point, duplication between the systems is released. SMI is issued to all CPUs 111 of CPU subsystems 110 in "SBY" mode when the state shifts to this ST9 and this state ST9 is continued until SMI ACK has been returned from all CPUs 111 to complete preparation for resynchronization processing. CPU subsystem 110 in this state ST9 is separated from the system. Thus, an access to IO subsystem 120 is discarded and master abort is returned to CPU subsystem 110.

3. State Separated from System (Fault)

3-1. "Fault" State ST10

This is a state where being separated from the system that is providing a service since a failure of CPU subsystem 110 has been specified or a state where being compulsorily isolated from software for separation of CPU subsystem 110. In this state ST10, access is impossible from the inside and outside of the system. An access from CPU subsystem 110 to IO subsystem 120 is processed as master abort.

Tables 3 and 4 show whether requests to be exchanged between CPU subsystem 110 and IO subsystem 120 are allowed to be transmitted or suppressed in respective states. Here, all completions to the requests are allowed to be transmitted. In the Tables, ○ represents "accessible", Δ represents "restricted", and X represents that master abort is returned to the request.

TABLE 3

Outbound access from CPU subsystem to IO subsystem

| State | CPU outbound request/message |
|---|---|
| Online sync | ○ |
| Pre online sync | |
| Online ready | |
| Online async | |
| Online divide | Δ |
| Offline divide | (Destination = only IO of own system Fully accessible to resource of own system; however access made to resource of other system through crosslink is restricted Accessible to DMA/shared resource controller; however not accessible to IO device of other system |
| Offline | ○ |
| Recover offline | CPUs of both system are accessible to each other in asynchronous state; however exclusive access control by software is required |
| Pre offline | X |
| Fault | (master abort) |

○: Accessible
Δ: Restricted
X: Master abort

TABLE 4

Inbound access from CPU subsystem to IO subsystem

| State | IO inbound request/message |
|---|---|
| Online sync | ○ |
| Pre online sync | |
| Online ready | |
| Online async | |
| Online divide | Δ |
| Offline divide | (Source = only IO of own system) |
| Recover offline | ○ |
| Offline | Δ (Source = only DMA/shared resource controller) |
| Pre offline | X |
| Fault | |

○: Accessible
Δ: Restricted
X: Master abort

With regard to the outbound access from CPU subsystem 110 to IO subsystem 120, only the access from CPU subsystem 110 that is providing a service is effective in ordinary cases. Therefore, a corresponding completion is returned to only CPU subsystem 110 that is providing a service, so that CPU subsystem 110 that is not providing a service cannot access IO subsystem 120.

In order to cope with the above, a method that allows CPU subsystem 110 that is not providing a service to access IO subsystem 120 using an asynchronous request is provided in the present embodiment. The asynchronous request can be set using a not-shown router within the system 100 when CPU 111 is in "Offline" state ST7, "Offline divide" state ST6, and "Recover offline" state ST8. The asynchronous requests from systems 100 and 100 are individually processed as requests different between two systems and each completion to the requests is returned to system 100 that has issued the asynchronous request. There is a possibility that accesses are made to the same resource with the asynchronous request, so that it is necessary to avoid the conflict using exclusive access control realized by software.

Figure 7:
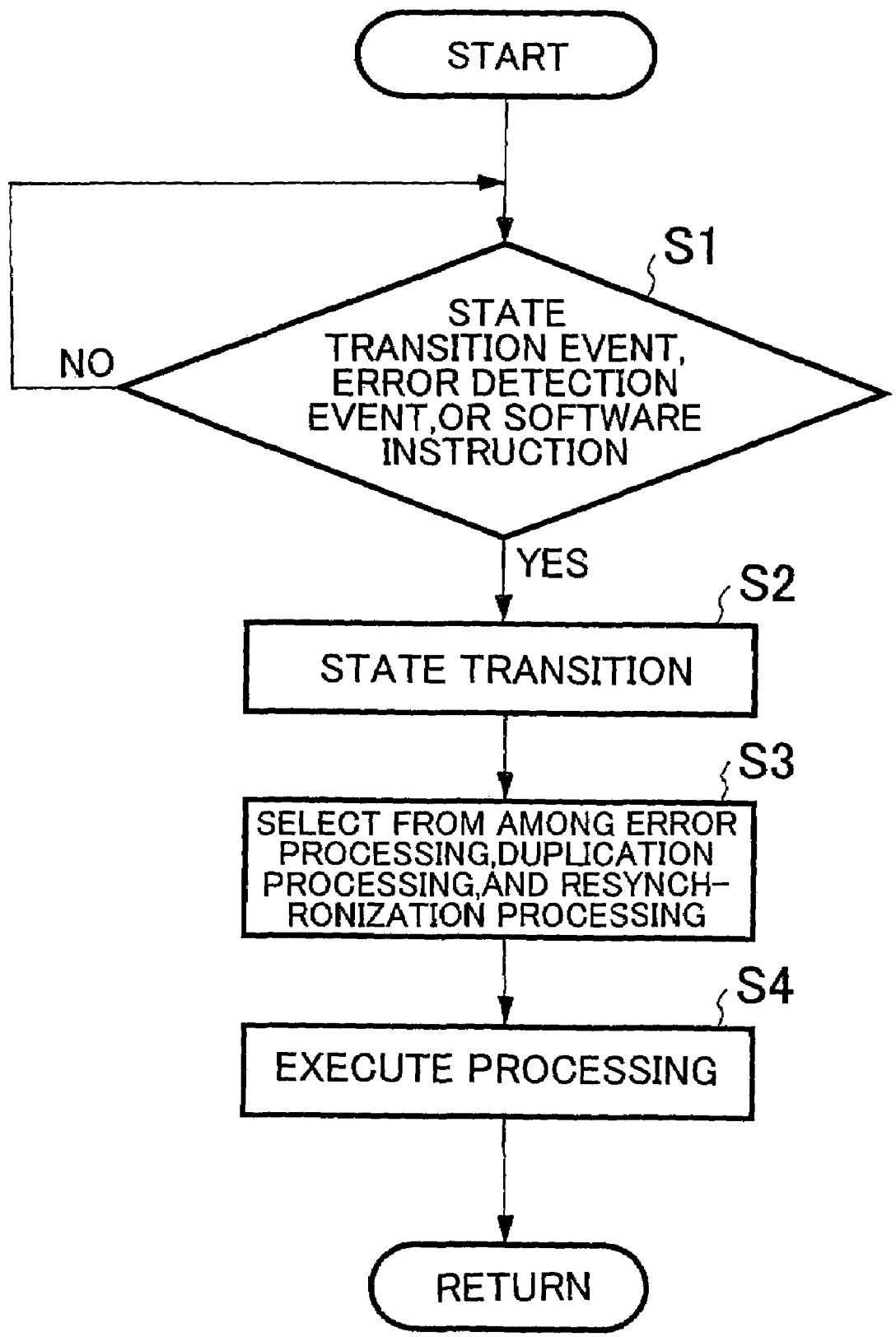
FIG. 7 is a flowchart schematically showing the processing performed in the fault tolerant system according to the embodiment.

FIG. 7 is a flowchart showing the processing that the FT controller 130 performs using the above states ST1 to ST10.

When receiving a state transition event or error detection event associated with the above states ST1 to ST10, or software instruction (previously set event signal) (step S1), the FT controller 130 correspondingly sets the state of CPU subsystem 110 (step S2: see FIGS. 8 to 11), selects, depending on the set state, processing for fault tolerant from among error processing, duplication processing (synchronization processing), and resynchronization processing (step S3), and allows CPU subsystem 110 (CPU 111) to execute the selected processing (step S4).

Figure 8:
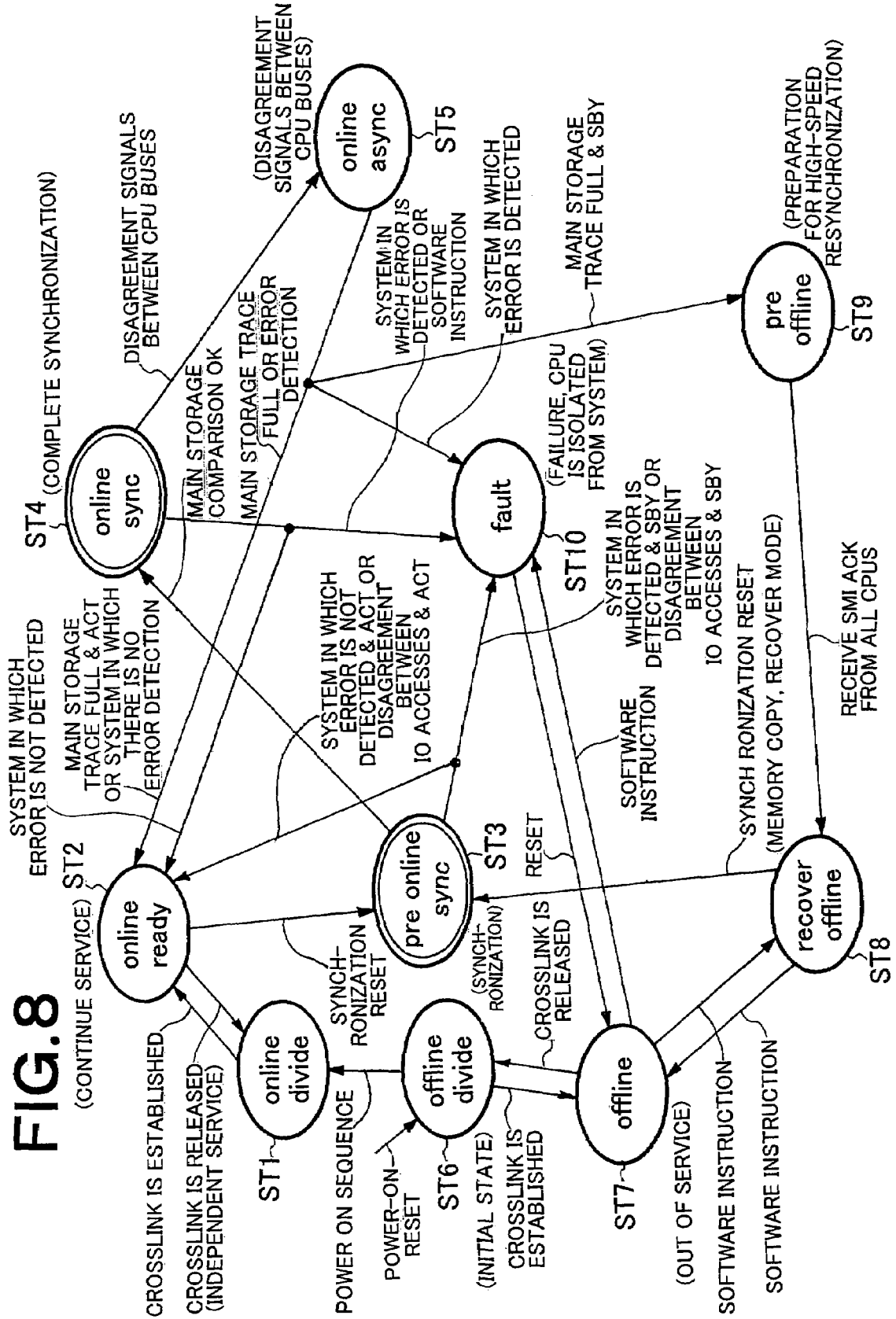
FIG. 8 is a view for explaining state transition in the fault tolerant system according to the embodiment.

FIG. 8 is a transition state diagram showing a state transition between states ST1 to ST10. As shown in FIG. 8, transitions between the states ST1 to ST10 that are managed by the FT controller 130 are made according to the state transition event, error detection event, or software instruction (previously set event signal).

FIGS. 9 to 11 are timing charts for explaining the state transition of CPU 111 taking place according to respective transition events.

FIG. 9 shows the processing sequence at system power-on time.

Firstly, on #0 system side, power-on reset of #0 system is performed (T100). The state at this time is "Offline divide" state ST6. Subsequently, the board controller 101 is used to set #0 system to "ACT" mode (T101). As a result, #0 system is shifted to "Online divide" state ST1. After that, the power on reset is released, and BIOS is set to boot an OS (T102 to T104).

Next, on #1 system side, power-on reset of #1 system is performed. The state at this time is "Offline divide" state ST6. Subsequently, the board controller 101 is used to set #1 system to "SBY" mode (T201). #0 system remains in "Offline divide" state ST6. After that, the power on reset is released, and BIOS is set (T202, T203).

Next, both systems are connected to each other by the crosslinks 140 and 140 (T204). Then, #0 system is shifted to "Online ready" state ST2 and #1 system is shifted to "Offline" state ST7.

Next, #1 system waits for a system synchronization process of CPU subsystem 110 while BIOS processing is looped (T205).

FIG. 10 shows the processing sequence at the time when synchronization processing of CPU subsystem 110 is performed.

Firstly, system synchronization processing is started on #0 system (T105). Then, #1 system is shifted from "Offline" state ST7 to "Recover offline" state ST8 after the BIOS loop (T205). At this time, #0 system remains in "Online ready" state ST2.

Next, on #0 system side, the DMA controller starts copying the memory (T106). When this copying operation has been completed (T107), SMI BIOS is used to perform interrupt handling for CPU 111 (T108) thereby coping cache/context of CPU 111 to #1 system (T109).

Next, a synchronization reset is applied to both systems (T110). As a result, #0 system is shifted from "Online ready" state ST2 to "Pre online sync" state ST3, and #1 system is shifted from "Recover offline" state ST8 to "Pre online sync" state ST3. At this time, #0 system operates in "ACT" mode, and #1 system operates in "SBY" mode.

Next, #0 system activates BIOS (T111), restores the context of CPU 111 (T112), goes back to OS (T113), and allows the DMA controller to check the memory (T114). When completing the memory check (T115), #0 system is shifted from "Pre online sync" state ST3 to "Online sync" state ST4.

Similarly, #1 system activates BIOS (T207), restores the context of CPU 111 (T208), goes back to OS (T209), and allows the DMA controller to check the memory (T210). When completing the memory check (T211), #1 system is shifted from "Pre online sync" state ST3 to "Online sync" state ST4.

At this time, #0 system operates in "ACT" mode, and #1 system operates in "SBY" mode.

FIG. 11 shows the processing sequence at the time from occurrence of a disagreement in CPU bus operation between both systems to the time when resynchronization operation is performed.

Firstly, when a synchronization fault occurs due to occurrence of a disagreement in CPU bus operation between both systems (T116, T212), both #0 and #1 systems are shifted from "Online sync" state ST4 to "Online async" state ST5. After that, memory access trace is performed for error check. When the access trace becomes "Almost full" (T117, T213), #0 system is shifted from "Online async" state ST5 to "Online ready" state ST2 and #1 system is shifted from "Online async" state ST5 to "Pre offline" state ST9.

Next, both systems use SMI BIOS to perform interrupt handling for CPU 111 (T118, T214) and #1 system is shifted from "Pre offline" state ST9 to "Recover offline" state ST8. At this time, #0 system remains in "Online ready" state ST2.

Next, both systems use the DMA controller to partly copy the memory 112 (T119, T215). When the copying operation has been completed (T120, T216), the cache/context of CPU 111 is copied to #1 system (T121, T217).

Next, both systems perform a synchronization reset (T122). As a result, #0 system is shifted from "Online ready" state ST2 to "Pre online sync" state ST3 and #1 system is shifted from "Recover offline" state ST8 to "Pre online sync" state ST3. At this time, #0 system operates in "ACT" mode, and #1 system operates in "SBY" mode.

Next, #0 system activates BIOS (T123), restores the context of CPU 111 (T124), goes back to OS (T125), and allows the DMA controller to check the memory (T126). When completing the memory check (T127), #0 system is shifted from "Pre online sync" state ST3 to "Online sync" state ST4.

Similarly, #1 system activates BIOS (T218), restores the context of CPU 111 (T219), goes back to OS (T220), and allows the DMA controller to check the memory (T221). When completing the memory check (T222), #1 system is shifted from "Pre online sync" state ST3 to "Online sync" state ST4.

As described above, in the embodiment of the present invention, a plurality of states that represent system operations required for the fault tolerant function are defined, and software operations for executing error processing, duplication processing (synchronization processing), and resynchronization processing in the defined state are specified, thereby realizing the fault tolerant function. That is, according to the present embodiment, separation/integration between the systems and disconnection/connection between the subsystems performed by the FT controller are specified according to the states, and software executed by CPUs of respective systems selects the processing such as error detection or resynchronization while confirming the state of own CPU, thereby realizing the fault tolerant function.

A duplicated computer system is exemplified as the fault tolerant system in the above embodiment. Alternatively, however, the present invention can be applied also to a triplicated or more multiplexed computer system.

What is claimed is:

1. A fault tolerant system including a plurality of systems constituted by the same computer hardware components, each of the systems comprising:
    a processor section that can operate in a lock-step synchronous state between own system and other system;
    an input/output section to be connected to the processor section;
    a controller to be connected between the processor section and input/output section; and
    a signal transmission path that connects the own system and other system through the controller,
    the controller comprising:
    state management means for managing a plurality of system operations for performing error processing, synchronization processing, and resynchronization processing for fault tolerant by associating a plurality of states corresponding to the system operations with predetermined event signals; and
    control means for selecting the plurality of system operations while changing the plurality of states for every system based on the event signals and allowing the processor section to perform selected system operation,
    wherein
    the plurality of states include:
    an online-system state corresponding to a state integrated into a system providing a service;
    an offline-system state corresponding to a state separated from a system providing a service; and
    a fault-system state corresponding to a state separated from a system providing a service due to error detection,
    wherein
    the online-system state includes:
    an online divide state corresponding to a state where the processor sections of the own and other systems operate in asynchronous state at power-on time; and
    an online ready state corresponding to a state where the processor sections of the own and other systems operate in asynchronous state,
    the offline-system state group includes:
    an offline divide state corresponding to a state where the processor sections of the own and other systems operate in asynchronous state at power-on time and constituting a pair with the online divide state; and
    an offline state corresponding to a state where the processor sections of the own and other systems operate in asynchronous state and constituting a pair with the online ready state.

2. The fault tolerant system according to claim 1, wherein the plurality of system operations include:
    an access control for controlling access between the processor section and input/output section in the own system;
    an access control for controlling access between the processor section and input/output section across the own and other systems;
    an access comparison for comparing access from the processor section to the input/output section across the own and other systems;
    an access comparison for of comparing access on a bus within the processor section across the own and other systems; and
    a main storage copy for copying data from a main storage of the processor section across the own and other systems.

3. The fault tolerant system according to claim 2, wherein the main storage copy includes a partial copy for partially copying data from the main storage of the processor section across the own and other systems.

4. The fault tolerant system according to claim 1, wherein the online-system state further includes:
    a pre-online synchronous state corresponding to a state where the processor sections of the own and other systems operate in synchronous state and data in a main storage of the processor section is being checked;
    an online synchronous state corresponding to a state where the processor sections of the own and other systems operate in synchronous state; and
    an online asynchronous state corresponding to a temporary state where a disagreement occurs in operation on a bus in the processor section between the own and other systems in the online synchronous state,
    the offline-system state group further includes:
    a recover offline state corresponding to a state where copying data from the main storage of the processor section across the own and other systems is performed and the processor sections of the own and other systems operate in asynchronous state; and
    a pre-offline state corresponding to a state being separated from the system at the time when a disagreement occurs in operation on a bus in the processor section between the own and other systems.

5. A controller used in a fault tolerant system including a plurality of systems constituted by the same processor section and input/output section, the controller being embodied in computer readable medium executable by a computer and comprising:
    state management means for managing a plurality of system operations for performing error processing, synchronization processing, and resynchronization processing for fault tolerant by associating a plurality of states corresponding to the system operations with predetermined event signals; and
    control means for selecting the plurality of system operations while changing the plurality of states for every system based on the event signals and allowing the processor section to perform selected system operation,
    wherein
    the plurality of states include:
    an online-system state corresponding to a state integrated into a system providing a service; and
    an offline-system state corresponding to a state separated from a system providing a service; and
    a fault-system state corresponding to a state separated from a system providing a service due to error detection, wherein
the online-system state includes:
an online divide state corresponding to a state where the processor sections of the own and other systems operate in asynchronous state at power-on time; and
an online ready state corresponding to a state where the processor sections of the own and other systems operate in asynchronous state,
the offline-system state group includes:
an offline divide state corresponding to a state where the processor sections of the own and other systems operate in asynchronous state at power-on time and constituting a pair with the online divide state; and
an offline state corresponding to a state where the processor sections of the own and other systems operate in asynchronous state and constituting a pair with the online ready state.

6. The controller according to claim 5, wherein the plurality of system operations include:
an access control for controlling access between the processor section and input/output section in the own system;
an access control for controlling access between the processor section and input/output section across the own and other systems;
an access comparison for comparing access from the processor section to the input/output section across the own and other systems;
an access comparison for of comparing access on a bus within the processor section across the own and other systems; and
a main storage copy for copying data from a main storage of the processor section across the own and other systems.

7. The controller according to claim 6, wherein the main storage copy includes a partial copy for partially copying data from the main storage of the processor section across the own and other systems.

8. The controller according to claim 5, wherein the online-system state further includes:
a pre-online synchronous state corresponding to a state where the processor sections of the own and other systems operate in synchronous state and data in a main storage of the processor section is being checked;
an online synchronous state corresponding to a state where the processor sections of the own and other systems operate in synchronous state; and
an online asynchronous state corresponding to a temporary state where a disagreement occurs in operation on a bus in the processor section between the own and other systems in the online synchronous state,
the offline-system state group further includes:
a recover offline state corresponding to a state where copying data from the main storage of the processor section across the own and other systems is performed and the processor sections of the own and other systems operate in asynchronous state; and
a pre-offline state corresponding to a state being separated from the system at the time when a disagreement occurs in operation on a bus in the processor section between the own and other systems.

9. An operation method used in a fault tolerant system including a plurality of systems constituted by the same processor section and input/output section, the operation method comprising the steps of:
managing a plurality of system operations for performing error processing, synchronization processing, and resynchronization processing for fault tolerant by associating a plurality of states corresponding to the system operations with predetermined event signals; and
selecting the plurality of system operations while changing the plurality of states for every system based on the event signals and allowing the processor section to perform selected system operation,
wherein
the plurality of states include:
an online-system state corresponding to a state integrated into a system providing a service;
an offline-system state corresponding to a state separated from a system providing a service; and
a fault-system state corresponding to a state separated from a system providing a service due to error detection,
wherein
the online-system state includes:
an online divide state corresponding to a state where the processor sections of the own and other systems operate in asynchronous state at power-on time;
an online ready state corresponding to a state where the processor sections of the own and other systems operate in asynchronous state,
the offline-system state group includes:
an offline divide state corresponding to a state where the processor sections of the own and other systems operate in asynchronous state at power-on time and constituting a pair with the online divide state; and
an offline state corresponding to a state where the processor sections of the own and other systems operate in asynchronous state and constituting a pair with the online ready state.

10. The operation method according to claim 9, wherein the plurality of system operations include:
an access control for controlling access between the processor section and input/output section in the own system;
an access control for controlling access between the processor section and input/output section across the own and other systems;
an access comparison for comparing access from the processor section to the input/output section across the own and other systems;
an access comparison for of comparing access on a bus within the processor section across the own and other systems; and
a main storage copy for copying data from a main storage of the processor section across the own and other systems.

11. The operation method according to claim 10, wherein the main storage copy includes a partial copy for partially copying data from the main storage of the processor section across the own and other systems.

12. The operation method according to claim 9, wherein the online-system state further includes:
a pre-online synchronous state corresponding to a state where the processor sections of the own and other systems operate in synchronous state and data in a main storage of the processor section is being checked;
an online synchronous state corresponding to a state where the processor sections of the own and other systems operate in synchronous state; and
an online asynchronous state corresponding to a temporary state where a disagreement occurs in operation on a bus in the processor section between the own and other systems in the online synchronous state, the offline-system state group further includes:
a recover offline state corresponding to a state where copying data from the main storage of the processor section across the own and other systems is performed and the processor sections of the own and other systems operate in asynchronous state; and
a pre-offline state corresponding to a state being separated from the system at the time when a disagreement occurs in operation on a bus in the processor section between the own and other systems.

13. A computer readable medium embodying an operation program used in a fault tolerant system including a plurality of systems constituted by the same processor section and input/output section, the operation program enabling a computer to execute an operation method comprising the steps of:
managing a plurality of system operations for performing error processing, synchronization processing, and resynchronization processing for fault tolerant by associating a plurality of states corresponding to the system operations with predetermined event signals; and
selecting the plurality of system operations while changing the plurality of states for every system based on the event signals and allowing the processor section to perform selected system operation,
wherein
the plurality of states include:
an online-system state corresponding to a state integrated into a system providing a service; and
an offline-system state corresponding to a state separated from a system providing a service; and
a fault-system state corresponding to a state separated from a system providing a service due to error detection;
wherein
the online-system state includes:
an online divide state corresponding to a state where the processor sections of the own and other systems operate in asynchronous state at power-on time; and
an online ready state corresponding to a state where the processor sections of the own and other systems operate in asynchronous state,
the offline-system state group includes:
an offline divide state corresponding to a state where the processor sections of the own and other systems operate in asynchronous state at power-on time and constituting a pair with the online divide state; and
an offline state corresponding to a state where the processor sections of the own and other systems operate in asynchronous state and constituting a pair with the online ready state.

14. The computer readable medium according to claim 13, wherein
the plurality of system operations include:
an access control for controlling access between the processor section and input/output section in the own system;
an access control for controlling access between the processor section and input/output section across the own and other systems;
an access comparison for comparing access from the processor section to the input/output section across the own and other systems;
an access comparison for of comparing access on a bus within the processor section across the own and other systems; and
a main storage copy for copying data from a main storage of the processor section across the own and other systems.

15. The computer readable medium according to claim 14, wherein the main storage copy includes a partial copy for partially copying data from the main storage of the processor section across the own and other systems.

16. The computer readable medium according to claim 13, wherein
the online-system state further includes:
a pre-online synchronous state corresponding to a state where the processor sections of the own and other systems operate in synchronous state and data in a main storage of the processor section is being checked;
an online synchronous state corresponding to a state where the processor sections of the own and other systems operate in synchronous state; and
an online asynchronous state corresponding to a temporary state where a disagreement occurs in operation on a bus in the processor section between the own and other systems in the online synchronous state,
the offline-system state group further includes:
a recover offline state corresponding to a state where copying data from the main storage of the processor section across the own and other systems is performed and the processor sections of the own and other systems operate in asynchronous state; and
a pre-offline state corresponding to a state being separated from the system at the time when a disagreement occurs in operation on a bus in the processor section between the own and other systems.

* * * * *